(12) United States Patent
Fukui

(10) Patent No.: US 11,641,525 B2
(45) Date of Patent: May 2, 2023

(54) IMAGE CAPTURING APPARATUS CAPABLE OF DISPLAYING LIVE VIEW IMAGE HIGH IN VISIBILITY, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Takaaki Fukui, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/684,549

(22) Filed: Mar. 2, 2022

(65) Prior Publication Data

US 2022/0294982 A1 Sep. 15, 2022

(30) Foreign Application Priority Data

Mar. 5, 2021 (JP) .............................. JP2021-034886

(51) Int. Cl.
*H04N 5/232* (2006.01)
*H04N 5/355* (2011.01)

(52) U.S. Cl.
CPC ... *H04N 5/23229* (2013.01); *H04N 5/232935* (2018.08); *H04N 5/35581* (2013.01)

(58) Field of Classification Search
CPC ......... H04N 5/23229; H04N 5/232935; H04N 5/23245; H04N 5/235; H04N 5/7725; H04N 9/8042
See application file for complete search history.

(56) References Cited

U.S. PATENT DOCUMENTS

| | | | | |
|---|---|---|---|---|
| 2009/0244353 A1* | 10/2009 | Koutaki | ........... | H04N 5/232939 348/E5.022 |
| 2012/0257077 A1* | 10/2012 | Suzuki | ................. | H04N 5/2355 348/222.1 |
| 2014/0307145 A1* | 10/2014 | Ito | ........................ | H04N 5/2351 348/333.08 |
| 2018/0077332 A1* | 3/2018 | Shimura | ................ | H04N 5/772 |
| 2020/0221028 A1* | 7/2020 | Kobayashi | ........... | H04N 5/2353 |
| 2021/0250486 A1* | 8/2021 | Kitashou | .............. | H04N 5/2353 |

FOREIGN PATENT DOCUMENTS

JP 2017-163339 A 9/2017

* cited by examiner

*Primary Examiner* — Hung H Lam
(74) *Attorney, Agent, or Firm* — Cowan, Liebowitz & Latman, P.C.

(57) ABSTRACT

An image capturing apparatus capable of displaying a live view image high in visibility on a high-luminance side. An image capturing section converts light from an object to image signals. An image processor performs image processing on image data formed by the image signals. An operation section receives an instruction for setting a live view mode for realizing a live view function. When an OVF simulation mode is set which is different from a recording live view mode for displaying image data subjected to the image processing on the image display section based on user's photographing settings, photographing is performed under an exposure condition darker than a proper exposure, gradation conversion for compensating for a difference in exposure condition from the proper exposure is performed, and display luminance is controlled to be brighter than display luminance in the recording live view mode.

10 Claims, 9 Drawing Sheets

*FIG. 5*

| OBJECT LUMINANCE (Bv) | DISPLAY LUMINANCE SETTING | RECORDING LIVE VIEW MODE MAXIMUM DISPLAY LUMINANCE | OVF SIMULATION MODE MAXIMUM DISPLAY LUMINANCE |
|---|---|---|---|
| NOT HIGHER THAN 2 | 1 | 49 | 86 |
| 2-4 | 2 | 86 | 150 |
| 4-6 | 3 | 150 | 262 |
| 6-8 | 4 | 262 | 458 |
| NOT LOWER THAN 8 | 5 | 458 | 800 |

| OBJECT LUMINANCE (Bv) | DISPLAY LUMINANCE SETTING | RECORDING LIVE VIEW MODE MAXIMUM DISPLAY LUMINANCE | OVF SIMULATION MODE MAXIMUM DISPLAY LUMINANCE |
|---|---|---|---|
| NOT HIGHER THAN 2 | 1 | 49 | 197 |
| 2-4 | 2 | 86 | 344 |
| 4-6 | 3 | 150 | 600 |
| 6-8 | 4 | 262 | 1049 |
| NOT LOWER THAN 8 | 5 | 458 | 1832 |

IMAGE CAPTURING APPARATUS CAPABLE OF DISPLAYING LIVE VIEW IMAGE HIGH IN VISIBILITY, METHOD OF CONTROLLING IMAGE CAPTURING APPARATUS, AND STORAGE MEDIUM

BACKGROUND OF THE INVENTION

Field of the Invention

The present invention relates to an image capturing apparatus that is capable of displaying a live view image which is high in visibility, a method of controlling the image capturing apparatus, and a storage medium.

Description of the Related Art

A mirrorless camera is equipped with, as a function of confirming an image to be photographed, a live view function for displaying a live view image on an EVF (electronic viewfinder) or a rear liquid crystal display in place of an OVF (optical viewfinder) included in a single-lens reflex camera. The OVF enables a user to directly view light incident through an optical lens, and hence the user can view colors and brightness of an object in the same manner as in a case where the user views them without using the finder of the camera. Therefore, even when performing photographing while following an object, or performing photographing of a backlight scene or the like, the OVF enables the user to perform photographing while recognizing the object. On the other hand, the live view image displayed on the EVF or the rear liquid crystal display is an image generated by performing image processing on an image captured by an image capturing device, and hence the live view image is an image in a limited dynamic range e.g. when photographing of a backlight scene is performed. For this reason, when photographing a scene having a wide dynamic range, such as a backlight scene, it is difficult to perform photographing while following an object or photographing while looking at a facial expression of an object, by using the EVF or the rear liquid crystal display.

In general, in the case of photographing a person in a backlight scene, if photographing is performed with a proper exposure determined based on a person area, a background area is overexposed, and inversely, if photographing is performed with a proper exposure determined based on the background area, the person area becomes dark. Therefore, in the case of photographing a person in a backlight scene, photographing is performed under an intermediate exposure between an exposure condition of a proper exposure for the person area and an exposure condition of a proper exposure for the background area. However, an image photographed under this exposure condition becomes an image low in visibility in which the person is dark and further a high-luminance portion, such as a background, is small in contrast. In view of such a problem, there is a demand for a technique for enabling an image high in visibility to be acquired even in a backlight scene. As a related art, there has been proposed a technique in Japanese Laid-Open Patent Publication (Kokai) No. 2017-163339. In Japanese Laid-Open Patent Publication (Kokai) No. 2017-163339, for example, gradation conversion is performed on a captured image so as to obtain linear characteristics over the whole luminance region from a low-luminance portion to a high-luminance portion, and the image subjected to this gradation conversion is recorded. Further, a human eye is high in sensitivity with respect to a low-to-medium luminance region, and hence when this image is displayed e.g. as a live view image, gradation conversion for increasing the display luminance in the low-to-medium luminance region is performed on this image.

However, if the gradation conversion for increasing the display luminance in the low-to-medium luminance region is performed when the image is displayed as the live view image as described above, a problem is caused that although the low-to-medium luminance region is adjusted to be easy to be viewed by a human eye, the gradation on a high-luminance side is compressed, and hence the visibility on the high-luminance side is lowered.

SUMMARY OF THE INVENTION

The present invention provides an image capturing apparatus that is capable of displaying a live view image which is high in visibility on a high-luminance side, a method of controlling the image capturing apparatus, and a storage medium.

In a first aspect of the present invention, there is provided an image capturing apparatus, comprising a recording unit, a display unit, at least one processor, and a memory coupled to the at least one processor, the memory having instructions that, when executed by the processor, perform the operations as: an image capturing unit configured to convert light from an object to image signals, an image processing unit configured to perform image processing on image data formed by the image signals obtained by the image capturing unit, and a reception unit configured to receive an instruction for setting a live view mode which is an operation mode for realizing a live view function for displaying image data subjected to the image processing on the display unit without recording the image data in the recording unit, wherein in a case where a second live view mode is set which is different from a first live view mode for displaying image data subjected to the image processing on the display unit based on photographing settings set by a user, the image capturing unit performs photographing under an exposure condition in the second live view mode, which is set to an exposure condition darker than a determined proper exposure, the image processing unit performs gradation conversion for compensating for a difference in exposure condition from the proper exposure, and the display unit controls display luminance in the second live view mode to be brighter than display luminance in the first live view mode.

In a second aspect of the present invention, there is provided a method of controlling an image capturing apparatus including a recording unit, a display unit, an image capturing unit configured to convert light from an object to image signals, an image processing unit configured to perform image processing on image data formed by the image signals obtained by the image capturing unit, and a reception unit configured to receive an instruction for setting a live view mode which is an operation mode for realizing a live view function for displaying image data subjected to the image processing on the display unit without recording the image data in the recording unit, comprising causing, in a case where a second live view mode is set which is different from a first live view mode for displaying image data subjected to the image processing on the display unit based on photographing settings set by a user, the image capturing unit to perform photographing under an exposure condition in the second live view mode, which is set to an exposure condition darker than a determined proper exposure, the image processing unit to perform gradation conversion for compensating for a difference in exposure condition from the proper exposure, and the display unit to control display luminance in the second live view mode to be brighter than display luminance in the first live view mode.

According to the present invention, the live view image which is high in visibility on the high-luminance side is displayed.

Further features of the present invention will become apparent from the following description of exemplary embodiments (with reference to the attached drawings).

BRIEF DESCRIPTION OF THE DRAWINGS

FIG. 5 is a diagram showing an example of maximum display luminance values on an image display section appearing in FIG. 1 when a recording live view mode and an OVF simulation mode are set, respectively.

DESCRIPTION OF THE EMBODIMENTS

Figure 1:
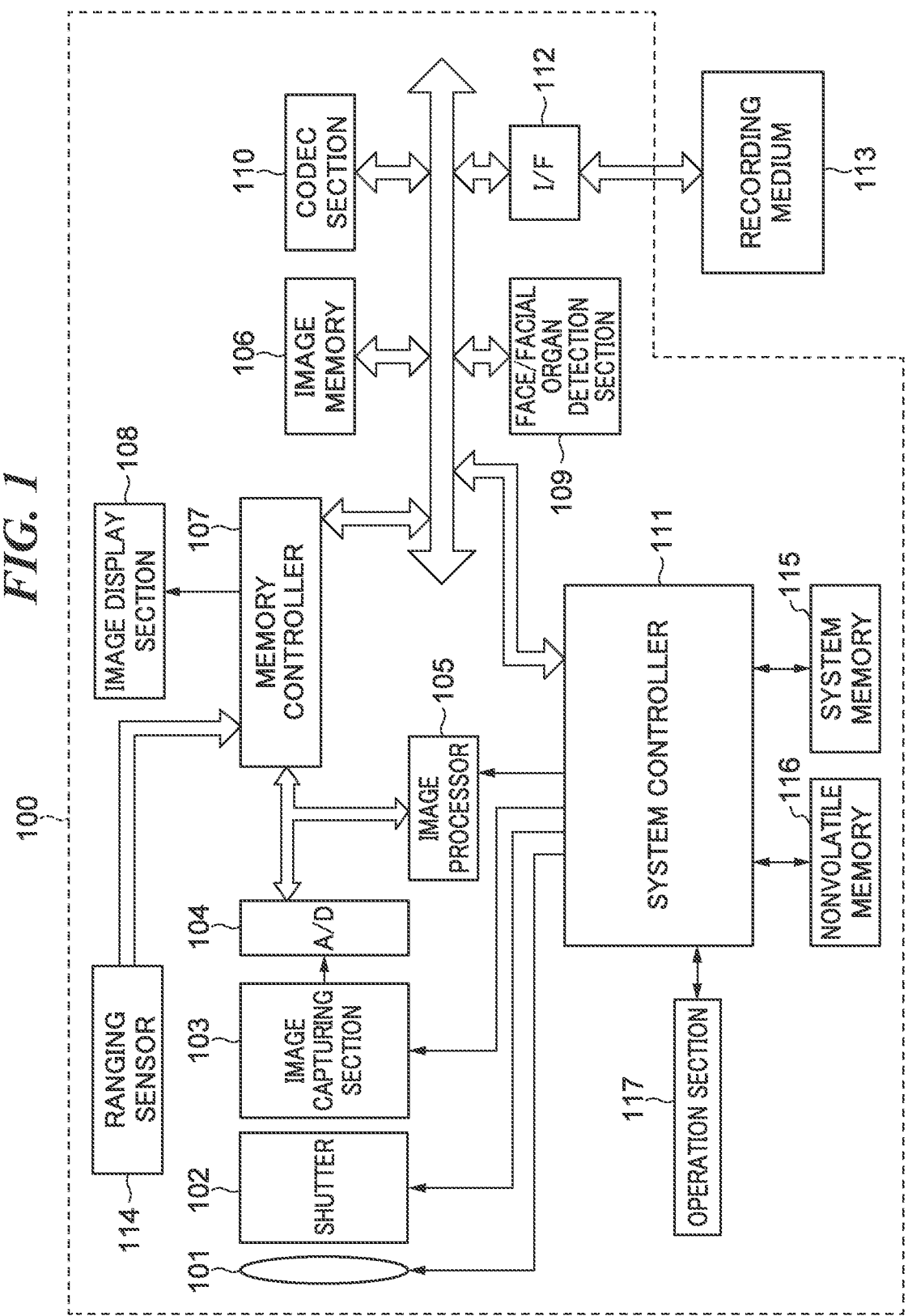
FIG. 1 is a schematic block diagram of a digital camera as an image capturing apparatus according to an embodiment of the present invention.

The present invention will now be described in detail below with reference to the accompanying drawings showing embodiments thereof Hereafter, an embodiment of the present invention will be described in detail with reference to the drawings. Note that in the present embodiment, a description will be given of a case where the present invention is applied to a digital camera as an image capturing apparatus, but the present invention is not limitatively applied to the digital camera. For example, the present invention may be applied to an apparatus equipped with a live view function, such as a personal computer (PC), a mobile phone, and a tablet terminal. The digital camera, denoted by reference numeral 100, as the image capturing apparatus has a recording mode for performing photographing according to photographing settings set by a user and recording a photographed image. The photographing settings are recording settings for setting e.g. an exposure correction value, a dynamic range, white balance, color tone, contrast, and a color conversion matrix coefficient, referred to hereinafter. Further, the digital camera 100 is equipped with a live view function for displaying a live view image on an image display section 108, described hereinafter, such as an EVF or a rear liquid crystal display, based on image signals acquired by an image capturing section 103, described hereinafter, without recording a photographed image. As operation modes for realizing the live view function, the digital camera 100 has a recording live view mode and an OVF simulation mode for simulating an OVF. In the recording live view mode, a live view image is displayed on the image display section 108, according to the same photographing settings as those used when an image is photographed. In the OVF simulation mode, a live view image adapted to a scene having a wide dynamic range, such as a backlight scene, is displayed on the image display section 108. A user sets, when using the live view function, one of the recording live view mode and the OVF simulation mode, using e.g. an operation section 117, described hereinafter.

FIG. 1 is a schematic block diagram of the digital camera 100 as an image capturing apparatus according to the embodiment of the present invention.

Referring to FIG. 1, the digital camera 100 includes a lens group 101, a shutter 102, the image capturing section 103, an analog-to-digital converter 104 (simply denoted as "A/D" in FIG. 1), an image processor 105, an image memory 106, a memory controller 107, the image display section 108, a face/facial organ detection section 109, a codec section 110, a system controller 111, an interface 112 (simply denoted as "I/F" in FIG. 1), a ranging sensor 114, a system memory 115, a nonvolatile memory 116, and the operation section 117 (reception unit).

The lens group 101 is an image capturing optical system including a zoom lens and a focus lens. The shutter 102 includes an aperture function. Light incident through the lens group 101 and the shutter 102 is photoelectrically converted by the image capturing section 103. The image capturing section 103 is implemented e.g. by a CCD or a CMOS device, and outputs electrical signals obtained by photoelectric conversion to the analog-to-digital converter 104 as analog image signals. The analog-to-digital converter 104 converts the analog image signals acquired from the image capturing section 103 to digital image signals and outputs the digital image signals to the image processor 105.

The image processor 105 performs a variety of image processing operations, such as color conversion processing including white balance, gradation conversion processing, contour emphasis processing, and color correction processing, on image data formed by digital image signals acquired from the analog-to-digital converter 104 or image data read from the image memory 106 via the memory controller 107. The image data subjected to image processing is written into the image memory 106 via the memory controller 107. The image memory 106 stores image data output from the image processor 105 and image data to be displayed on the image display section 108. The image display section 108 is an EVF, a rear liquid crystal display, or the like.

The face/facial organ detection section 109 detects a face of a person, organs included in a face, such as eyes and a nose, and a facial organ area, from a captured image. The image processor 105 performs predetermined evaluation value calculation processing using a result of detection by the face/facial organ detection section 109, a measurement result obtained by the ranging sensor 114, and the digital image signals acquired from the image capturing section 103. The system controller 111 performs exposure control and ranging control based on an evaluation value obtained by this evaluation value calculation processing. With this, TTL (through the lens) method-based AF (autofocus) processing, AE (auto exposure) processing, AWB (auto white balance) processing, and so forth are performed. The codec section 110 compresses and encodes image data stored in the image memory 106 based on standards, such as JPEG or MPEG.

The system controller 111 controls the overall operation of the digital camera 100 by executing programs stored in the system memory 115 or the nonvolatile memory 116. For example, the system controller 111 encodes image data stored in the image memory 106 and stores the encoded image data in a recording medium 113, such as a memory card or a hard disk, via the interface 112. Further, the system controller 111 controls the codec section 110 to decode and expand image data read out from the recording medium 113 via the interface 112 and stores the image data processed by the codec section 110 in the image memory 106. The image data stored in the image memory 106 is displayed on the image display section 108. The system memory 115 stores the programs and the like. The nonvolatile memory 116 stores the programs, setting data, and so forth. The operation section 117 receives a variety of operations performed by a user for giving a setting instruction, a photographing instruction, and so forth. For example, the operation section 117 receives an instruction for setting one of the recording live view mode and the OVF simulation mode from the user who uses the live view function.

Figure 2:
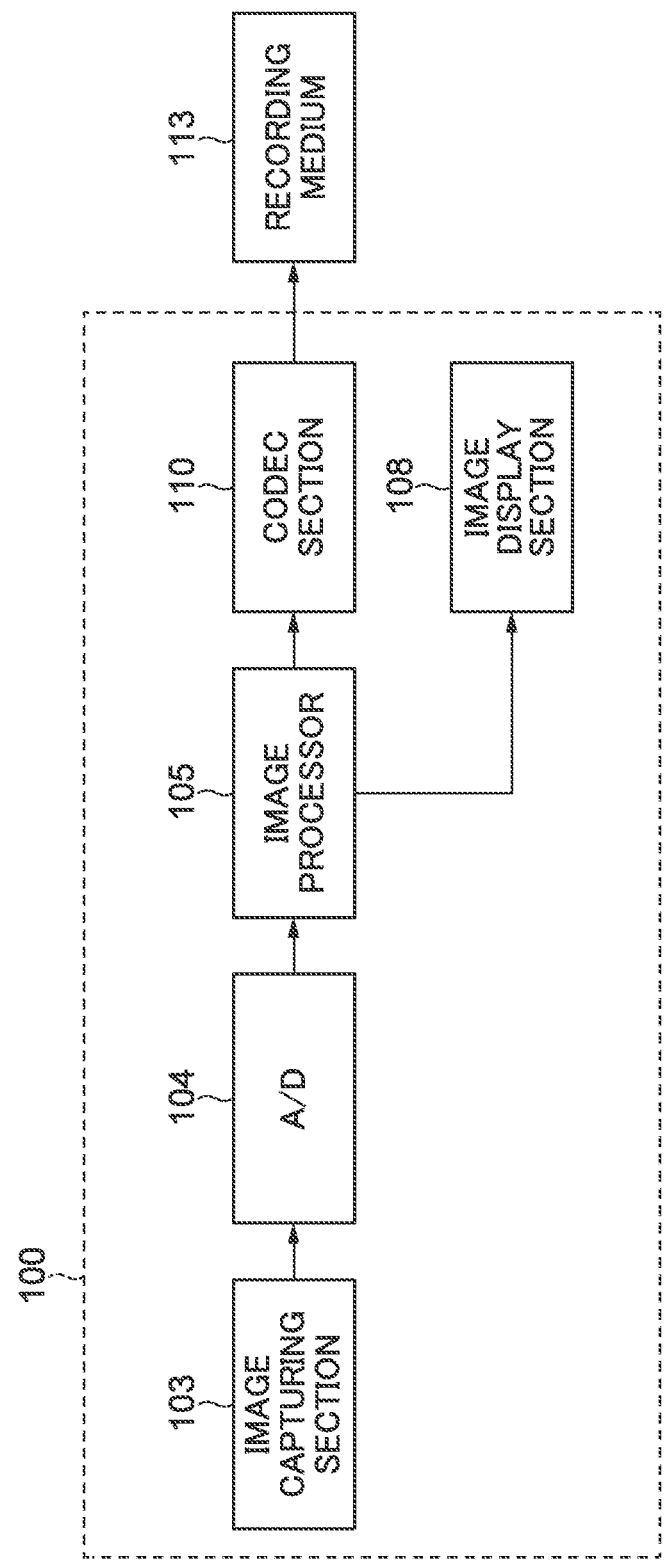
FIG. 2 is a block diagram useful in explaining a flow of image processing performed by the digital camera shown in FIG. 1.

FIG. 2 is a block diagram useful in explaining a flow of image processing performed by the digital camera 100 shown in FIG. 1. Analog image signals output from the image capturing section 103 are converted to digital image signals by the analog-to-digital converter 104, and the digital image signals are output to the image processor 105. The image processor 105 generates image data for recording and image data for display based on the acquired digital image signals. The image processor 105 outputs the image data for recording to the codec section 110 and outputs the image data for display to the image display section 108. The image data for recording is encoded by the codec section 110 and stored in the recording medium 113. For example, an SDR (Standard Dynamic Range) still image is recorded in the recording medium 113 as an image file of the JPEG format, and an HDR (High Dynamic Range) still image is recorded in the recording medium 113 as an image file of the HEIF (High Efficiency Image File) format. Further, a moving image is recorded in the recording medium 113 as an image file of e.g. MP4 in common to the SDR image and the HDR image. The image display section 108 displays the image data for display, acquired from the image processor 105, as the live view image. The image display section 108 is the EVF or the rear liquid crystal display as mentioned above, which is a device that receives an SDR-based sRGB image. The image processor 105 does not output the HDR image as it is, but converts the HDR image to an SDR image and then outputs the SDR image to the image display section 108 configured as described above. Further, in the present embodiment, an image can be displayed not only on the image display section 108, but also on an external display device connected via an external output terminal, such as an HDMI (registered trademark).

Figure 3:
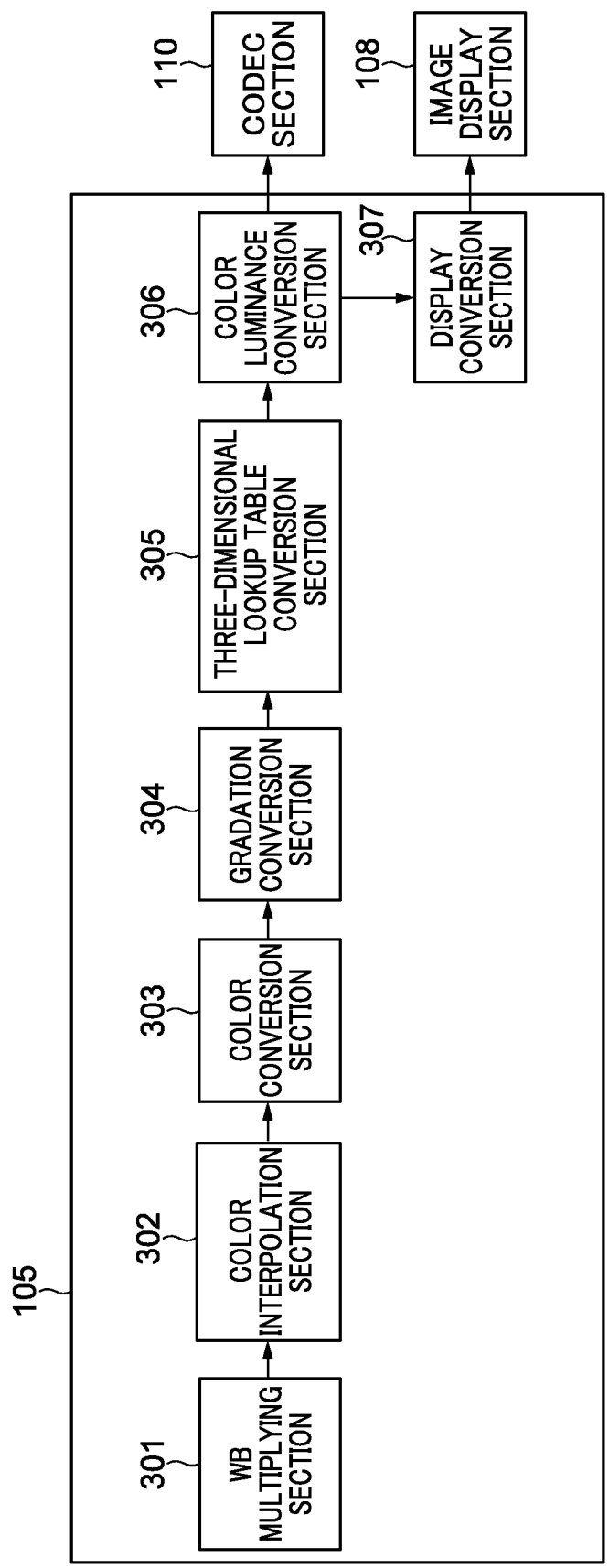
FIG. 3 is a schematic block diagram of an image processor appearing in FIG. 1.

FIG. 3 is a schematic block diagram of the image processor 105 appearing in FIG. 1. Referring to FIG. 3, the image processor 105 includes a white balance multiplying section (denoted as the "WB multiplying section" in FIG. 3) 301, a color interpolation section 302, a color conversion section 303, a gradation conversion section 304, a three-dimensional lookup table conversion section 305, a color luminance conversion section 306, and a display conversion section 307. Processing operations performed by these components of the image processor 105 are realized by the system controller 111 that executes programs stored in the system memory 115 or the nonvolatile memory 116.

The white balance multiplying section 301 multiplies digital image signals acquired from the image capturing section 103 (hereinafter simply referred to as the "image signals") by white balance coefficients. The white balance coefficients are auto white balance coefficients calculated by image analysis for face detection, white point extraction, and the like, or white balance coefficients determined based on a preset white balance mode set by the user. The color interpolation section 302 performs color interpolation processing on the image signals processed by the white balance multiplying section 301. RGB signals corresponding to all pixels are generated by color interpolation. The color conversion section 303 performs color conversion processing on image data formed by the image signals after color interpolation. Note that details of the color conversion processing will be described hereinafter. The gradation conversion section 304 sets gradation characteristics and performs gradation conversion on the image data after color conversion processing. The three-dimensional lookup table conversion section 305 performs color conversion on the image data so as to finely adjust color to a desired color tone after gradation conversion, and further, performs gamut mapping suitable for recording and display. The color luminance conversion section 306 converts image signals forming the image data processed by the three-dimensional lookup table conversion section 305 from the RGB signals which are the three primary color signals to YUV signals which are color luminance signals.

In a case where the user sets the recording mode, the image processor 105 outputs the image signals converted to the YUV signals to the codec section 110. The image data formed by these image signals is encoded by the codec section 110, and is then recorded in the recording medium 113 as an image file of the JPEG format when the SDR image has been photographed, and recorded in the recording medium 113 as an image file of the HEIF format when the HDR image has been photographed.

In a case where the user sets the recording live view mode or the OVF simulation mode, the display conversion section 307 performs color conversion and gradation conversion suitable for the image display section 108, on the image signals converted to the YUV signals. Then, the image data for display formed by the processed image signals is displayed on the image display section 108 as the live view image. Note that although FIG. 3 shows only one display conversion section 307, the image processor 105 includes a plurality of display conversion sections 307 associated with respective display devices. Each display conversion section 307 outputs an image suitable for the specifications of an associated one of the display devices. Thus, in the digital camera 100, the image is displayed on the plurality of display devices at the same time.

Figure 4:
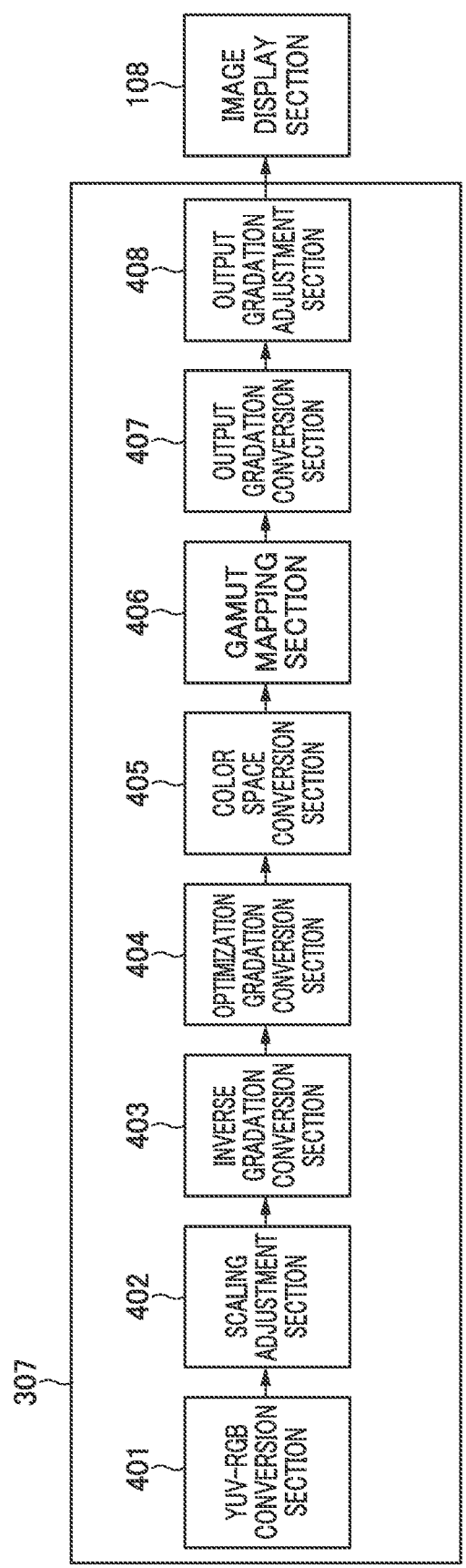
FIG. 4 is a schematic block diagram of a display conversion section appearing in FIG. 3.

FIG. 4 is a schematic block diagram of the display conversion section 307 appearing in FIG. 3. Referring to FIG. 4, the display conversion section 307 includes a YUV-RGB conversion section 401, a scaling adjustment section 402, an inverse gradation conversion section 403, an optimization gradation conversion section 404, a color space conversion section 405, a gamut mapping section 406, an output gradation conversion section 407, and an output gradation adjustment section 408.

The YUV-RGB conversion section 401 converts the image signals converted to the YUV signals by the color luminance conversion section 306 from the YUV signals to RGB signals. The YUV-RGB conversion section 401 uses conversion coefficients associated with an output color space set for the image processor 105 as conversion coefficients for converting the YUV signals to the RGB signals. The scaling adjustment section 402 performs scaling of an output range on the image signals converted to the RGB signals according to the maximum value which can be assumed depending on the gradation characteristics set by the gradation conversion section 304.

The inverse gradation conversion section 403 performs inverse gradation conversion on the image signals acquired from the scaling adjustment section 402 using EOTF (Electro-Optical Transfer Function) having inverse gradation conversion characteristics to OETF (Opto-Electronic Transfer Function) used when the image is generated. In the inverse gradation conversion section 403, out of a PQ format and an HLG format conforming to the ITU-R BT. 2100 standard which is an international standard, the PQ format is employed, for example. The optimization gradation conversion section 404 performs gradation conversion on the image signals acquired from the inverse gradation conversion section 403, such that display on the image display section 108 is made optimum. The color space conversion section 405 acquires image signals of a Rec. 2020 color space from the optimization gradation conversion section 404 and converts the color space of the acquired image signals to a color space displayed on the image display section 108, such as sRGB. The gamut mapping section 406 performs gamut mapping processing in accordance with the image signals acquired from the color space conversion section 405 and the color space displayed on the image display section 108.

The output gradation conversion section 407 performs gradation conversion using the OETF associated with the color space input to the image display section 108, such as the sRGB, on the image signals acquired from the gamut mapping section 406. The output gradation adjustment section 408 adjusts the number of gradations of the image signals acquired from the output gradation conversion section 407 such that the image signals are each caused to have a number of bits which can be input to the image display section 108, for example, 8 bits defined by the sRGB, and outputs the adjusted image signals to the image display section 108.

Next, the display luminance characteristics in the image display section 108 will be described. The image display section 108 performs gradation conversion on the input signals of 8 bits defined by the sRGB based on the display luminance setting for controlling the brightness of the image. In the digital camera 100, when the live view image is displayed in the OVF simulation mode, the display luminance setting is changed to an appropriate value based on the brightness (object luminance) of the surrounding detected by the digital camera 100.

FIG. 5 is a diagram showing an example of maximum display luminance values on the image display section 108 appearing in FIG. 1 when the recording live view mode and the OVF simulation mode are set, respectively. In the digital camera 100, as the display luminance setting, out of five steps, 1 to 5, of settings, one corresponding to the object luminance is set. For example, when the setting of the display luminance setting increases by one step, the display luminance of the image display section 108 becomes 1.75 times brighter. In a case where the display luminance setting is set to the same value for the recoding live view mode and the OVF simulation mode, the image display section 108 controls the display luminance in the OVF simulation mode to be 1.75 times brighter, i.e. brighter than the display luminance in the recording live view mode by a value corresponding to one step higher in the the display luminance setting. Note that in the present embodiment, also when an image recorded in the recording medium 113 in the recording mode is displayed on the image display section 108, the image is displayed on the image display section 108 with the same brightness as in the recording live view mode. That is, in a case where the display luminance setting is set to the same value for the recoding mode and the OVF simulation mode, the image display section 108 controls the display luminance in the OVF simulation mode to be 1.75 times brighter, i.e. brighter than the display luminance set when the image recorded in the recording medium 113 is displayed by a value corresponding to one step higher in the display luminance setting. This control of the display luminance of the image display section 108 is realized by the system controller 111 that executes an associated program stored in the system memory 115 or the nonvolatile memory 116.

Next, the operations of the image capturing section 103 and the color conversion section 303 performed for image formation by the digital camera 100 will be described. The processing operations performed by the image capturing section 103 and the color conversion section 303 are realized by the system controller 111 that executes associated programs stored in the system memory 115 or the nonvolatile memory 116.

When the recording mode or the recording live view mode is set, the image capturing section 103 performs photographing under an exposure condition determined based on an evaluation result and an analysis result of the AE processing, and an exposure correction value included in the photographing settings. On the other hand, when the OVF simulation mode is set, the image capturing section 103 performs photographing under an exposure condition one step darker than a proper exposure, referred to hereinafter, which has been determined to be proper based on analysis of a scene regardless of the photographing settings.

The color conversion section 303 sets color conversion matrix coefficients based on a recording setting included in the photographing settings when a final image is photographed in the recording mode or when an image is captured in the recording live view mode. For example, the color conversion section 303 sets, based on the recording setting, color conversion matrix coefficients adjusted such that colors on which preference of a user is reflected are reproduced or color conversion matrix coefficients adjusted such that faithful colors are reproduced in an output color space. In a case where the output color space is changed by the user, the color conversion matrix coefficients are changed according to the output color space specified by the user. In general, an sRGB color space is used as the output color space for the SDR, and the Rec. 2020 color space is used as the output color space for the HDR. By multiplying the color conversion matrix coefficients adjusted for the SDR, by conversion coefficients for converting the color space from the sRGB color space to the Rec. 2020 color space, the color conversion matrix coefficients for the HDR can be calculated. In the Rec. 2020 color space, a color space wider than the sRGB color space is defined. Therefore, image signals converted by the color conversion matrix coefficients for the HDR become image signals wider in color gamut than image signals converted by the color conversion matrix coefficients for the SDR. On the other hand, when the OVF simulation mode is set, the color conversion section 303 sets color conversion matrix coefficients for use in HDR photographing , i.e. the color conversion matrix coefficients for the HDR. With this, it is possible to display a live view image in which a scene of a wider color space is reproduced, in the OVF simulation mode.

Figure 6A:
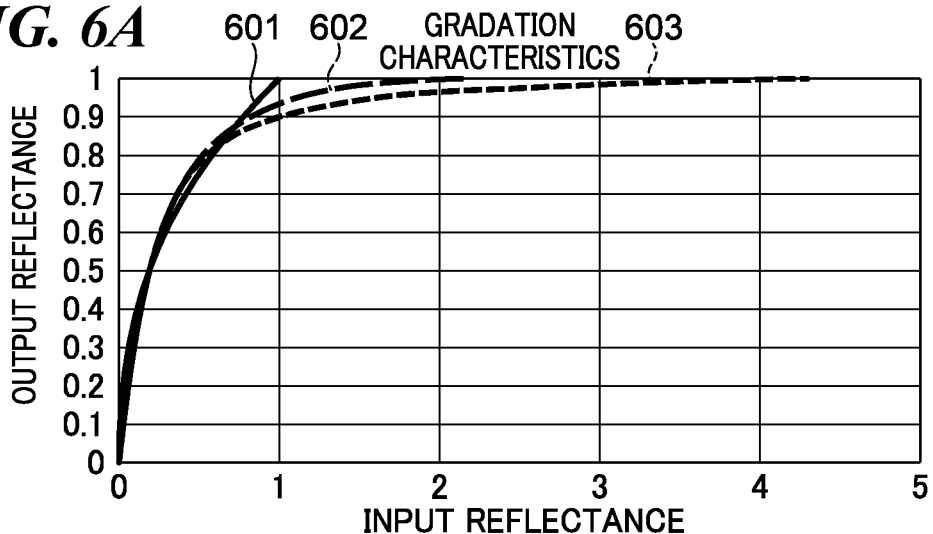
FIGS. 6A to 6C are diagrams useful in explaining gradation conversion characteristics set to a gradation conversion section appearing in FIG. 3.

Next, the gradation conversion characteristics of the gradation conversion section 304 appearing in FIG. 3 will be described. FIG. 6A is a diagram showing examples of gradation characteristics set for the gradation conversion section 304. Reference numeral 601 denotes an example of gradation characteristics defined by the sRGB. Reference numeral 602 denotes an example of gradation characteristics set for the gradation conversion section 304 when generating an SDR image, which are gradation characteristics applied when the image is photographed with a proper exposure. Reference numeral 603 denotes an example of gradation characteristics set for the gradation conversion section 304 when generating an SDR image, which are gradation characteristics set so as to cause photographing to be performed under an exposure condition one step darker than the proper exposure and increase the luminance level of the photographed image to a proper level by gradation conversion. In FIG. 6A, a horizontal axis represents reflectances to associated input luminance values of an object (input reflectances) expressed by image signals input to the gradation conversion section 304, and a vertical axis represents reflectances (output reflectances) expressed by associated image signals output from the the gradation conversion section 304. On the horizontal axis in FIG. 6A, an input reflectance of 100% of a white object is expressed as "1.0", and respective input reflectances of 200%, 300%, 400%, and 500% are expressed as "2.0", "3.0", "4.0", and "5.0", respectively.

In general, the exposure condition is determined such that the output luminance of an object at an input reflectance of 18% becomes a predetermined brightness. Note that the exposure condition may be determined at one point in a photographing area, such as in spot photometry, and further, the exposure condition may be determined based on information on the whole screen or the brightness of a specific portion in a face area. In the present embodiment, the proper exposure refers to an exposure under such a condition that the output luminance of an object at the input reflectance of 18% becomes a predetermined brightness. Further, a proper exposure luminance refers to a display luminance of an image photographed with the propre exposure. In the digital camera 100, for generating an SDR image and an HDR image, photographing is performed under an exposure condition that the input reflectance ranges up to 200%, and when the OVF simulation mode is set, photographing is performed under an exposure condition that the input reflectance ranges up to 400%, by making the image one step darker. Here, the photographing under the exposure condition that the input reflectance ranges up to 200% refers to photographing performed, by controlling the aperture and the like, under an exposure condition that photographing can be performed such that, with reference to an input reflectance of 18% of an object, light up to an input reflectance of 200% is not saturated at the image capturing section 103. Note that in the gradation characteristics in the case of photographing an image with a proper exposure (see e.g. 602), a knee characteristic is set such that room for gradation is left on a saturation side by making a dark portion even darker, so as to make the contrast of an image higher than in the gradation characteristic defined by the sRGB (see e.g. 601).

As described above, photographing is performed under an exposure condition one step darker than the proper exposure, and gradation characteristics for compensating for the difference from the proper exposure, more specifically, gradation characteristics for increasing the luminance level of an image by the above-mentioned exposure difference, are set for the gradation conversion section 304, whereby it is possible to record image data having output characteristics which are made higher in the luminance level by one step corresponding to the above-mentioned exposure difference. However, in the output characteristics, for example, as indicated by 603 in FIG. 6A, the dynamic range is improved in an output reflectance range of not smaller than 0.8 and the number of gradations in a saturated portion is small, so that the visibility of the saturated portion is low. Therefore, in the present embodiment, HDR photographing is performed in the OVF simulation mode.

Figure 6B:
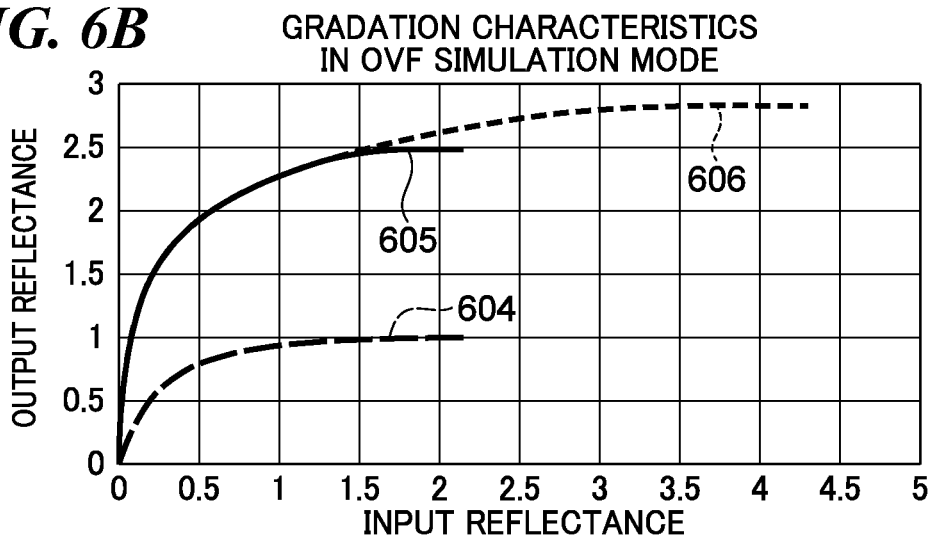

FIG. 6B is a diagram showing an example of gradation characteristics set for the gradation conversion section 304 appearing in FIG. 3. Reference numeral 604 denotes an example of gradation characteristics of sRGB gamma setting for SDR photographing. Reference numeral 605 denotes an example of gradation characteristics of PQ gamma setting for HDR photographing. Reference numeral 606 denotes an example of gradation characteristics in the OVF simulation mode. In FIG. 6B, a horizontal axis represents input reflectances, and a vertical axis represents output reflectances. For example, in FIG. 6B, the reference numeral 604 indicates gradation characteristics in which an output of 8 bits becomes 1.0 on the vertical axis.

An HDR image is recorded in the recording medium 113 as a 10-bit image, and hence the HDR image has gradations which are four times as many as those of an SDR image recorded as an 8-bit image. In FIG. 6B, the gradation characteristics set for HDR photographing (see e.g. 605) has the number of gradations which are larger than that of the gradation characteristics set for SDR photographing (see e.g. 604) on a high-luminance side. Further, as for the gradation characteristics in the OVF simulation mode (see e.g. 606), photographing is performed at an input reflectance of 400% by photographing an object under an exposure condition one step darker than the proper exposure, and gradation characteristics for increasing the luminance level of the image by one step corresponding to the exposure difference from the proper exposure are set for the gradation conversion section 304, whereby a larger number of gradations are secured on the high-luminance side than in the case of gradation characteristic for HDR photographing (see e.g. 605).

Figure 6C:
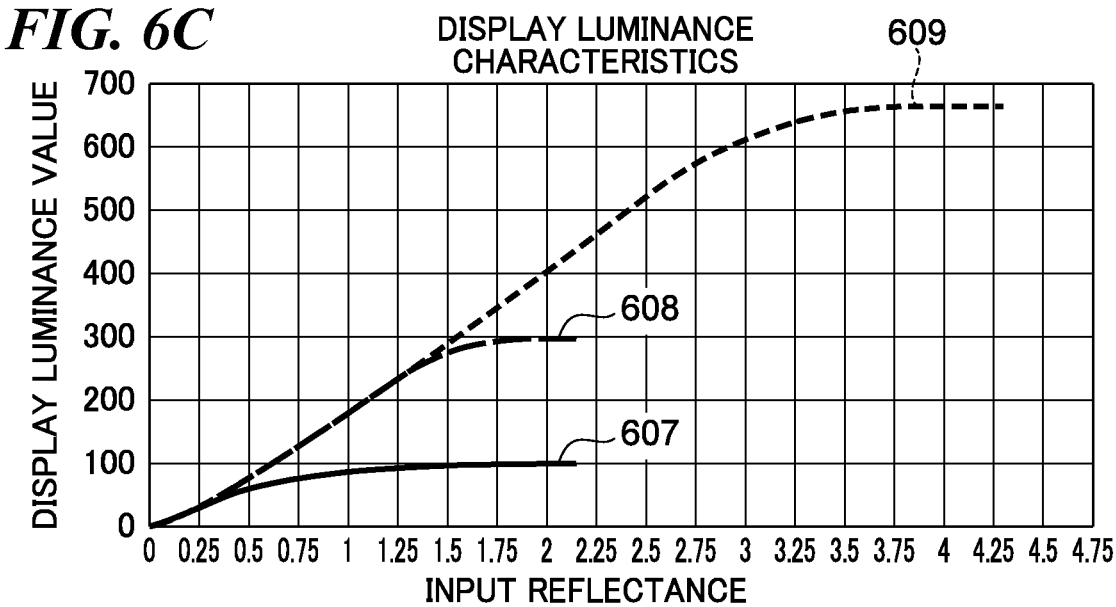

FIG. 6C is a diagram showing an example of display luminance characteristics appearing when an image converted based on each of the three types of gradation characteristics indicated in FIG. 6B is displayed. In FIG. 6C, a horizontal axis represents input reflectances, and a vertical axis represents display luminance values. The maximum luminance is defined as 100 nits in the sRGB standard, and hence in FIG. 6C, reference numeral 607 indicates display luminance characteristics appearing when the maximum luminance is set to 100 nits. Note that in FIG. 6C, reference numerals 608 and 609 indicate display luminance values for HDR photographing and display luminance values in the OVF simulation mode, which are converted according to the HDR PQ standard, respectively, and the display luminance values are output luminance values of an image output to a display monitor conforming to the HDR standard. In FIG. 6C, comparison between the display luminance characteristics for SDR photographing (indicated by 607) and the display luminance characteristics for HDR photographing (indicated by 608) shows that the two types of display luminance characteristics are equivalent from an input reflectance of 0% (dark portion) to an input reflectance of 30%. It is found that when the input reflectance exceeds 30%, the display luminance characteristics for HDR photographing have a higher gradation property than the display luminance characteristics for SDR photographing. Further, it is found that the display luminance characteristics in the OVF simulation mode (see e.g. 609) has a higher gradation property than the display luminance characteristics for HDR photographing.

Next, the processing performed by the display conversion section 307 appearing in FIG. 3 will be described. The scaling adjustment section 402 of the display conversion section 307 determines a scaling coefficient based on the maximum output value of the gradation conversion section 304. In the present embodiment, the scaling adjustment section 402 calculates the scaling coefficient such that the output from the inverse gradation conversion section 403 becomes 100 nits when in the OVF simulation mode. For example, an output of 100 nits for a 10-bit image becomes approximately 520 LSB, from the specification of the PQ signal defined by ST. 2084, and hence the scaling adjustment section 402 calculates the scaling coefficient such that the maximum output value of the gradation conversion section 304 becomes 520 LSB. The scaling adjustment section 402 multiplies each signal value of RGB signals by the calculated scaling coefficient. In the present embodiment, since photographing is performed in the OVF simulation mode under the exposure condition one step darker than the proper exposure, the output value of the gradation conversion section 304 becomes approximately 720 LSB (655 nits after PQ conversion), so that the scaling coefficient is calculated as 520/720=0.72.

Figure 7:
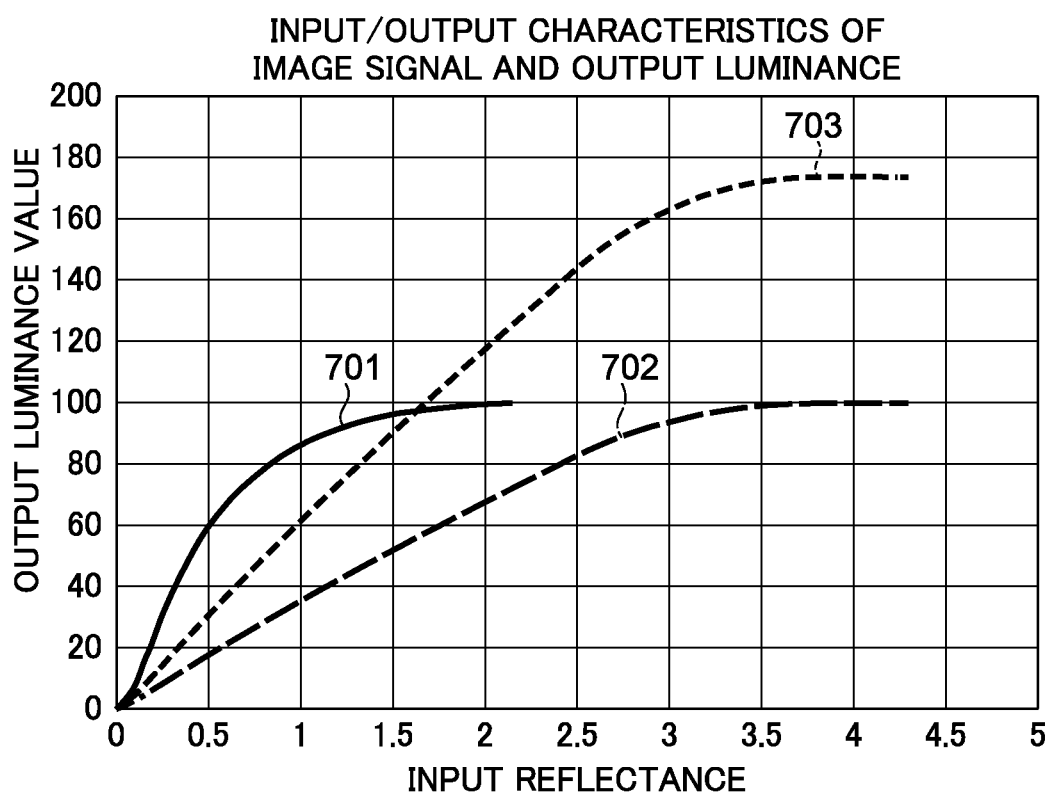
FIG. 7 is an image diagram of input/output characteristics of image signals, on which scaling is performed by a scaling adjustment section appearing in FIG. 4, and an output luminance.

FIG. 7 is an image diagram of input/output characteristics of an image signal on which scaling has been performed by the scaling adjustment section 402 appearing in FIG. 4, and an output luminance. In FIG. 7, a horizontal axis represents input reflectances and a vertical axis represents output luminance values. In FIG. 7, reference numeral 701 denotes an example of output luminance values after scaling for SDR photographing. As indicated by 701, the output luminance value (in nit values) after scaling for SDR photographing is set such that the output luminance value of the image display section 108 at RGB=255 (8 bits) becomes 100 nits. Reference numeral 702 denotes an example of the output luminance after scaling for HDR photographing. Comparison between 701 and 702 shows that in HDR photographing, the gradation property on the high-luminance side is higher than in SDR photographing, but darker than in SDR photographing in a low-to-medium luminance region. That is, in HDR photographing, the visibility in the low-to-medium luminance region is lower than in SDR photographing. Reference numeral 703 denotes an example of the output luminance after scaling in the OVF simulation mode. In the OVF simulation mode, as mentioned above, the display luminance is controlled to be 1.75 times brighter than the display luminance of the image display section 108 in the recording live view mode and the display luminance of the image display section 108 when an image recorded in the recording medium 113 in the recording mode is displayed. With this, it is possible to improve the visibility of the live view image in the OVF simulation mode by making the low-to-medium luminance region bright while maintaining the high gradation property in the high-luminance side.

Figure 8A:
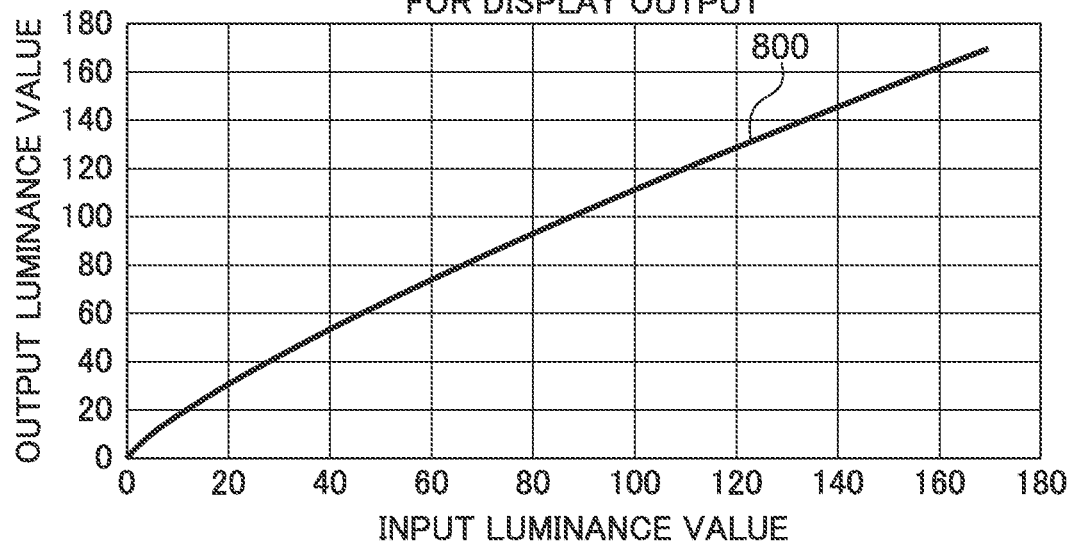
FIGS. 8A and 8B are diagrams useful in explaining an output luminance after gradation conversion performed by an optimization gradation conversion section appearing in FIG. 4.

FIG. 8A is a diagram showing an example of gradation conversion characteristics for display output, which are set for the optimization gradation conversion section 404 appearing in FIG. 4. In FIG. 8A, a horizontal axis represents input luminance values indicated by image signals input to the optimization gradation conversion section 404 and a vertical axis represents output luminance values of the mage signals output from the optimization gradation conversion section 404. Reference numeral 800 denotes gradation conversion characteristics for display output when the gamma is 1/1.25. In the present embodiment, the gamma value to be set for the optimization gradation conversion section 404 for adjusting the brightness may be calculated by calculating an output value associated with an input reflectance of 18%, using the output characteristics of SDR and HDR with respect to the input reflectance of 18% in the gradation conversion section 304, and the above-described scaling coefficient. Further, the gradation conversion characteristics may be calculated in advance with respect to a combination of an exposure difference between the OVF simulation mode and the proper exposure and the brightness setting of the panel.

Figure 8B:
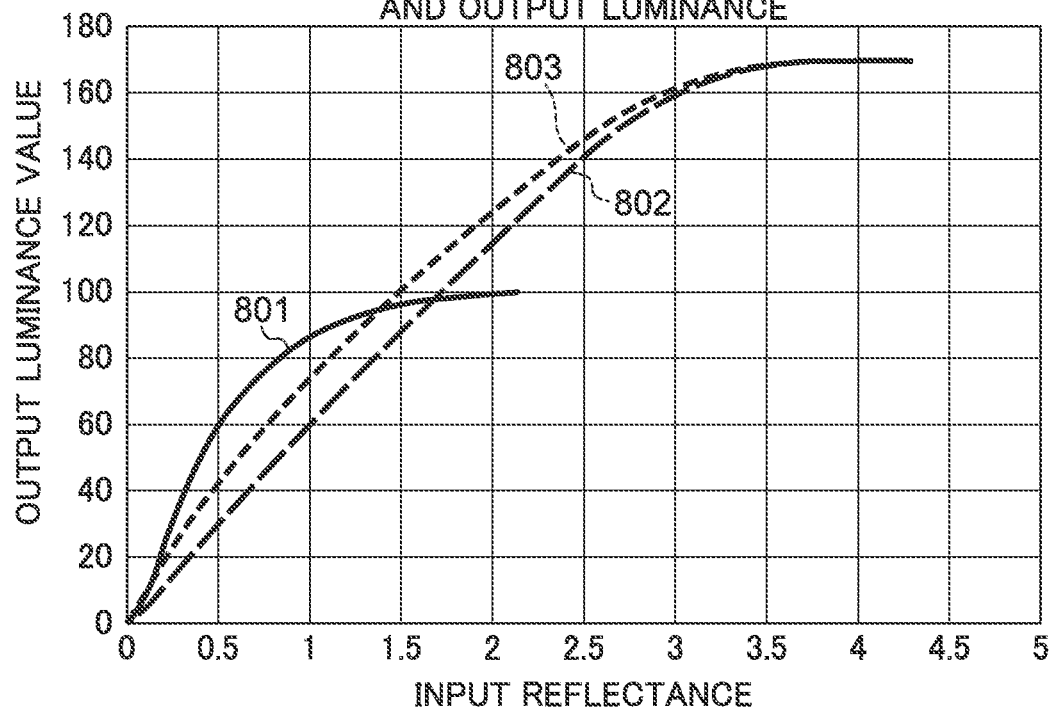

FIG. 8B is an image diagram of input/output characteristics of an input reflectance indicated by an image signal and an output luminance after gradation conversion performed by the optimization gradation conversion section 404 appearing in FIG. 4. In FIG. 8B, a horizontal axis represents input reflectances, and a vertical axis represents output luminance values. Reference numeral 801 denotes an example of the output luminance after gradation conversion performed by the optimization gradation conversion section 404 for SDR photographing. Reference numeral 802 denotes an example of the output luminance before gradation conversion performed by the optimization gradation conversion section 404 in the OVF simulation mode. Reference numeral 803 denotes an example of the output luminance after gradation conversion performed by the optimization gradation conversion section 404 in the OVF simulation mode. Comparison between 802 and 803 shows that the low-to-medium luminance region becomes brighter than before gradation conversion performed by the optimization gradation conversion section 404, and the visibility of the live view image in the OVF simulation mode is more improved.

As described above, according to the present embodiment, in a case where the OVF simulation mode is set, the image capturing section 103 performs photographing by controlling the exposure condition in the OVF simulation mode to be one step darker than the determined proper exposure. The image processor 105 performs gradation conversion for compensating for the difference in exposure condition from the proper exposure. The image display section 108 controls the display luminance in the OVF simulation mode such that the display luminance is made brighter than the display luminance in the recording live view mode. With this, it is possible to display a live view image in which the gradation on the high-luminance side is not compressed, i.e. a live view image which is high in visibility on the high-luminance side.

Further, in the above-described embodiment, when recording an image in the recording medium 113, an image converted to a 10-bit image is recorded in the recording medium 113. When displaying an image on the image display section 108, an image converted to an 8-bit image by the output gradation adjustment section 408 is output to the image display section 108. Here, according to the HDR standard, the HDR image is demanded to be recorded in the number of gradations not smaller than 10 bits. On the other hand, the display device, such as the EVF, is configured to output 8 bits. By taking these into consideration, in the present embodiment, an image generating process up to the processing performed by the color luminance conversion section 306 generates an image in the large number of gradations. When this image is recorded in the recording medium 113, an image converted to a 10-bit image is recorded in the recording medium 113. On the other hand, when this image is displayed on the image display section 108, an image converted to an 8-bit image by the output gradation adjustment section 408 is output to the image display section 108. With this, it is possible to display a live view image which is high in visibility on the high-luminance side and further, it is possible to record an image having a high gradation property in the recording medium 113.

In the above-described embodiment, in the SDR photographing, an 8-Bit image conforming to the sRGB is generated by the image processor 105. With this, it is possible to reduce the capacity of the image memory 106 used for displaying and recording an image.

Further, in the above-described embodiment, in the OVF simulation mode, HDR photographing is set regardless of settings set by a user. This makes it possible to acquire image data having a high gradation property, and as a result, it is possible to display a live view image having a high gradation property based on this image data.

Further, in the above-described embodiment, the image processor 105 includes the plurality of display conversion sections 307 associated with the plurality of display devices, respectively. This makes it possible to provide optimum images for the plurality of display devices, respectively, which are different in specifications. As a result, it is possible to display a live view image which is high in visibility on the high-luminance side on each of the plurality of display devices.

In the above-described embodiment, the display conversion section 307 converts the number of gradations of image data to be processed to the number of gradations which can be input to an associated display device. This makes it possible to provide each display device with an image suited to the specifications of the display device.

In the above-described embodiment, the plurality of display devices include the EVF and the rear liquid crystal display, and hence it is possible to display a live view image which is high in visibility on the high-luminance side on each of the EVF and the rear liquid crystal display.

Although the present invention has been described using the above-described embodiment, the present invention is not limited to the above-described embodiment. For example, in the inverse gradation conversion section 403, the HLG format may be employed.

Figures 9A, 9B:
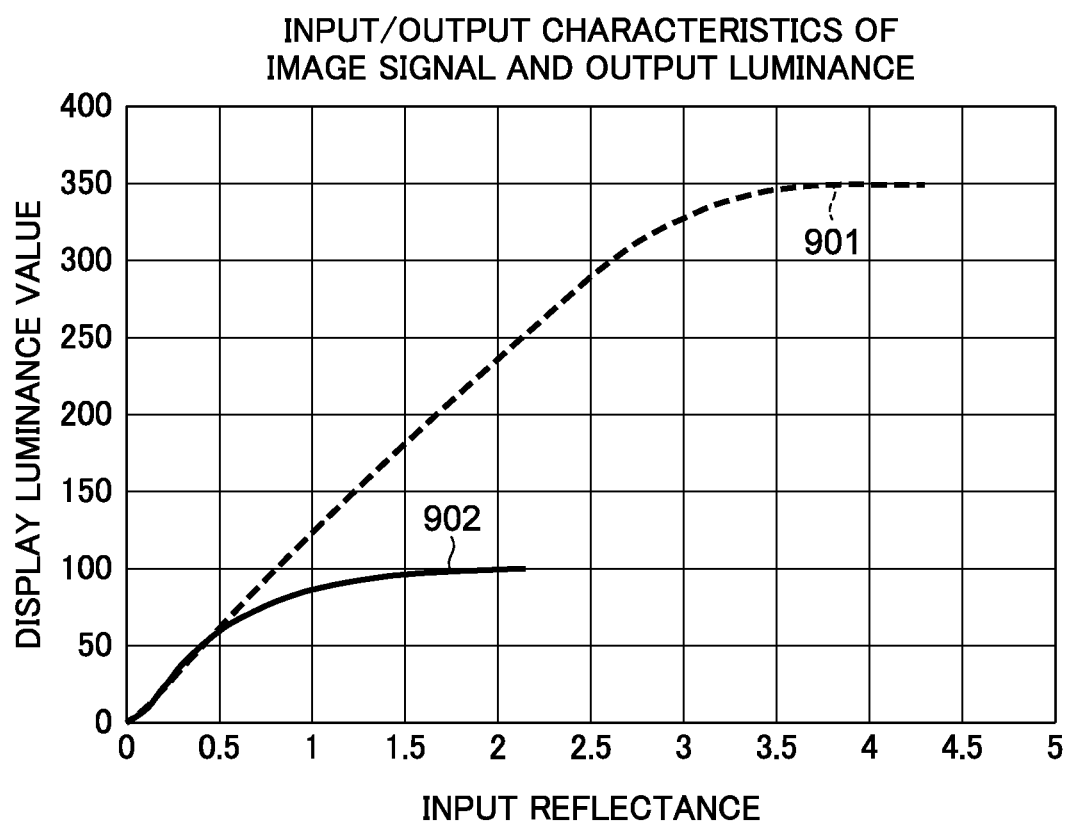
FIGS. 9A and 9B are diagrams useful in explaining a display luminance when the OVF simulation mode is set.

Further, although in the above-described embodiment, in the OVF simulation mode, the display luminance is controlled to be 1.75 times brighter than the display luminance setting in the recording live view mode, this is not limitative. For example, the display luminance in the OVF simulation mode may be controlled to be equivalent in brightness to that for SDR photographing in the low-to-medium luminance region. FIG. 9A is a diagram showing an example of the maximum display luminance values on the image display section 108 appearing in FIG. 1 when the display mode is the recording live view mode and the OVF simulation mode. For example, as shown in FIG. 9A, the display luminance in the OVF simulation mode is controlled to be four times brighter than the display luminance setting in the recording live view mode. By this control, for example, as shown in FIG. 9B, the display luminance in the OVF simulation mode (see e.g. 901) becomes the same level as the display luminance for SDR photographing (see e.g. 902) in the low-to-medium luminance region. With this, it is possible to display a live view image which is high in visibility in the low-to-medium luminance region in the OVF simulation mode without performing gradation conversion by the optimization gradation conversion section 404.

Further, in the above-described embodiment, photographing may be performed while displaying a live view image on the image display section 108 and outputting an HDR image to an external display device connected via an external output terminal, such as an HDMI. With this, it is possible to display an image which is high in visibility on the high luminance side on the external display device which is an HDR-compatible external display device having a larger screen than the image display section 108.

In the above-described embodiment, the exposure control value in the OVF simulation mode may be determined according to a dynamic range amount determined by scene analysis. In a case where the exposure control value is automatically determined not based on the photographing settings, but based on the scene analysis, the gradation conversion characteristics of the gradation conversion section 304 or of the output gradation conversion section 407 are adjusted based on the determined exposure control value and the display luminance setting of the image display section 108.

Further, in the above-described embodiment, in a case where an operation for instructing to change the photographing settings is performed by a user during display of the live view image in the OVF simulation mode, an image photographed based on the photographing settings specified by the user may be recorded in the recording medium 113. For example, in a case where the user sets an exposure correction value during display of the live view image in the OVF simulation mode, the live view image on which exposure correction based on the set exposure correction value has not been performed is displayed as its, but image data photographed based on this exposure correction value is recorded in the recording medium 113.

In the above-described embodiment, the above-mentioned live view image improved in visibility on the high-luminance side may be displayed only on the EVF, and the live view image corresponding to an image captured in the recording live view mode, i.e. the live view image based on the same photographing settings as those used when the image is photographed may be displayed on the rear liquid crystal display. With this, it is possible to display a live view image close to one displayed on the OVF, on the EVF which requires a user to look into a small panel, and display the image equivalent to the recorded image on the rear liquid crystal display. As a result, the same usage as the single-lens reflex camera can be realized in a mirrorless camera which is not equipped with the OVF.

Further, in the above-described embodiment, the digital camera 100 may control the maximum luminance of the EVF to be higher than the maximum luminance of the rear liquid crystal display in the OVF simulation mode. With this, a live view image higher in visibility than the display on the rear liquid crystal display can be displayed on the EVF requiring a user to look into a small panel, and as a result, it is possible to improve the use feeling of the user.

In the above-described embodiment, when displaying an image recorded after continuous shooting, the above-mentioned image improved in visibility on the high-luminance side may be displayed on the EVF, and an image obtained according to the photographing settings applied for photographing may be displayed on the rear liquid crystal display. By thus controlling the display images, it is possible to display a live view image which is high in visibility on the EVF during continuous shooting and improve the use feeling of a user.

Note that as described above, the control for displaying different images on the EVF and the rear liquid crystal display, respectively, can be realized by being provided with both of image generating means for generating the above-described image improved in visibility on the high-luminance side and other image generating means for generating an image based on the photographing settings applied for photographing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-034886 filed Mar. 5, 2021, which is hereby incorporated by reference herein in its entirety.

What is claimed is:

1. An image capturing apparatus, comprising:
a recording unit;
a display unit;
at least one processor; and
a memory coupled to the at least one processor, the memory having instructions that, when executed by the processor, perform the operations as:
an image capturing unit configured to convert light from an object to image signals;
an image processing unit configured to perform image processing on image data formed by the image signals obtained by the image capturing unit; and
a reception unit configured to receive an instruction for setting a live view mode which is an operation mode for realizing a live view function for displaying image data subjected to the image processing on the display unit without recording the image data in the recording unit,
wherein in a case where a second live view mode is set which is different from a first live view mode for displaying image data subjected to the image processing on the display unit based on photographing settings set by a user, the image capturing unit performs photographing under an exposure condition in the second live view mode, which is set to an exposure condition darker than a determined proper exposure, the image processing unit performs gradation conversion for compensating for a difference in exposure condition from the proper exposure, and the display unit controls display luminance in the second live view mode to be brighter than display luminance in the first live view mode.

2. The image capturing apparatus according to claim 1, wherein one of SDR (Standard Dynamic Range) photographing and HDR (High Dynamic Range) photographing is set, and
wherein in the second live view mode, the HDR photographing is set regardless of settings set by the user.

3. The image capturing apparatus according to claim 2, wherein in a case where the HDR photographing is set, one of a PQ format and an HLG format conforming to the ITU-R BT. 2100 standard is used.

4. The image capturing apparatus according to claim 2, wherein in a case where the HDR photographing is set, the image processing unit executes conversion processing for converting a Rec. 2020 color space to an sRGB color space.

5. The image capturing apparatus according to claim 1, comprising the plurality of display units, and
wherein the image processing unit includes a plurality of display conversion units associated with the plurality of display units, respectively.

6. The image capturing apparatus according to claim 5, wherein the display conversion unit converts the number of gradations of image data to be processed to the number of gradations which can be input to an associated display unit.

7. The image capturing apparatus according to claim 5, wherein the plurality of display units include an EVF and a rear liquid crystal display.

8. The image capturing apparatus according to claim 7, wherein in the second live view mode, a maximum luminance of the EVF is controlled to be higher than a maximum luminance of the rear liquid crystal display.

9. A method of controlling an image capturing apparatus including a recording unit, a display unit, an image capturing unit configured to convert light from an object to image signals, an image processing unit configured to perform image processing on image data formed by the image signals obtained by the image capturing unit, and a reception unit configured to receive an instruction for setting a live view mode which is an operation mode for realizing a live view function for displaying image data subjected to the image processing on the display unit without recording the image data in the recording unit, comprising:
causing, in a case where a second live view mode is set which is different from a first live view mode for displaying image data subjected to the image processing on the display unit based on photographing settings set by a user,
the image capturing unit to perform photographing under an exposure condition in the second live view mode, which is set to an exposure condition darker than a determined proper exposure,
the image processing unit to perform gradation conversion for compensating for a difference in exposure condition from the proper exposure, and the display unit to control display luminance in the second live view mode to be brighter than display luminance in the first live view mode.

10. A non-transitory computer-readable storage medium storing a program for causing a computer to execute a method of controlling an image capturing apparatus including a recording unit, a display unit, an image capturing unit configured to convert light from an object to image signals, an image processing unit configured to perform image processing on image data formed by the image signals obtained by the image capturing unit, and a reception unit configured to receive an instruction for setting a live view mode which is an operation mode for realizing a live view function for displaying image data subjected to the image processing on the display unit without recording the image data in the recording unit, wherein the method comprises:

causing, in a case where a second live view mode is set which is different from a first live view mode for displaying image data subjected to the image processing on the display unit based on photographing settings set by a user, the image capturing unit to perform photographing under an exposure condition in the second live view mode, which is set to an exposure condition darker than a determined proper exposure, the image processing unit to perform gradation conversion for compensating for a difference in exposure condition from the proper exposure, and the display unit to control display luminance in the second live view mode to be brighter than display luminance in the first live view mode.

* * * * *